(12) United States Patent  (10) Patent No.: US 7,191,903 B2
Amesoeder  (45) Date of Patent: Mar. 20, 2007

(54) FILTER INSERT WITH VARIABLE LENGTH CENTER TUBE

(75) Inventor: Dieter Amesoeder, Tamm (DE)

(73) Assignee: Mann & Hummel GmbH, Ludwigsburg (DE)

( * ) Notice: Subject to any disclaimer, the term of this patent is extended or adjusted under 35 U.S.C. 154(b) by 367 days.

(21) Appl. No.: 10/759,219

(22) Filed: Jan. 20, 2004

(65) Prior Publication Data

US 2004/0206690 A1  Oct. 21, 2004

(51) Int. Cl.
*B01D 27/08* (2006.01)

(52) U.S. Cl. .................. 210/457; 210/497.01

(58) Field of Classification Search ........... 210/437, 210/440, 497.01, 441, 450, 457, 352, 232
See application file for complete search history.

(56) References Cited

U.S. PATENT DOCUMENTS

| 3,246,766 A | * | 4/1966 | Pall ............... 210/457 |
| 3,592,766 A | * | 7/1971 | Kudlaty ............ 210/232 |
| 3,642,141 A | * | 2/1972 | Hobson, Jr. ....... 210/323.2 |
| 4,442,004 A | | 4/1984 | Smith et al. |
| 5,043,068 A | | 8/1991 | Karbachsch et al. |

FOREIGN PATENT DOCUMENTS

| DE | 90 16 239.0 U1 | 3/1991 |
| DE | 94 19 087.9 U1 | 3/1995 |
| GB | 1027335 A * | 4/1966 |

OTHER PUBLICATIONS

German Search Report dated Sep. 18, 2003, including the English translation of the relevant portion (Four (4) pages).

* cited by examiner

*Primary Examiner*—Terry K. Cecil
(74) *Attorney, Agent, or Firm*—Crowell & Moring LLP

(57) ABSTRACT

A filter insert (1) having an annular filter element (2) which is connected in a fluid-tight manner to a cover (5) on one axial end face (3) and to a base (6) on an opposite axial end face (4). The filter element (2) has a central channel (25) in which a central tube (8, 28) is situated. The central tube (8, 28) extends between the cover (5) and the base (6) and communicates with a central opening (7) in the cover (5). To ensure high stability of the filter (1) with a low manufacturing complexity, the central tube (8, 28) is designed to have a variable length in the direction of its longitudinal central axis (10).

9 Claims, 4 Drawing Sheets

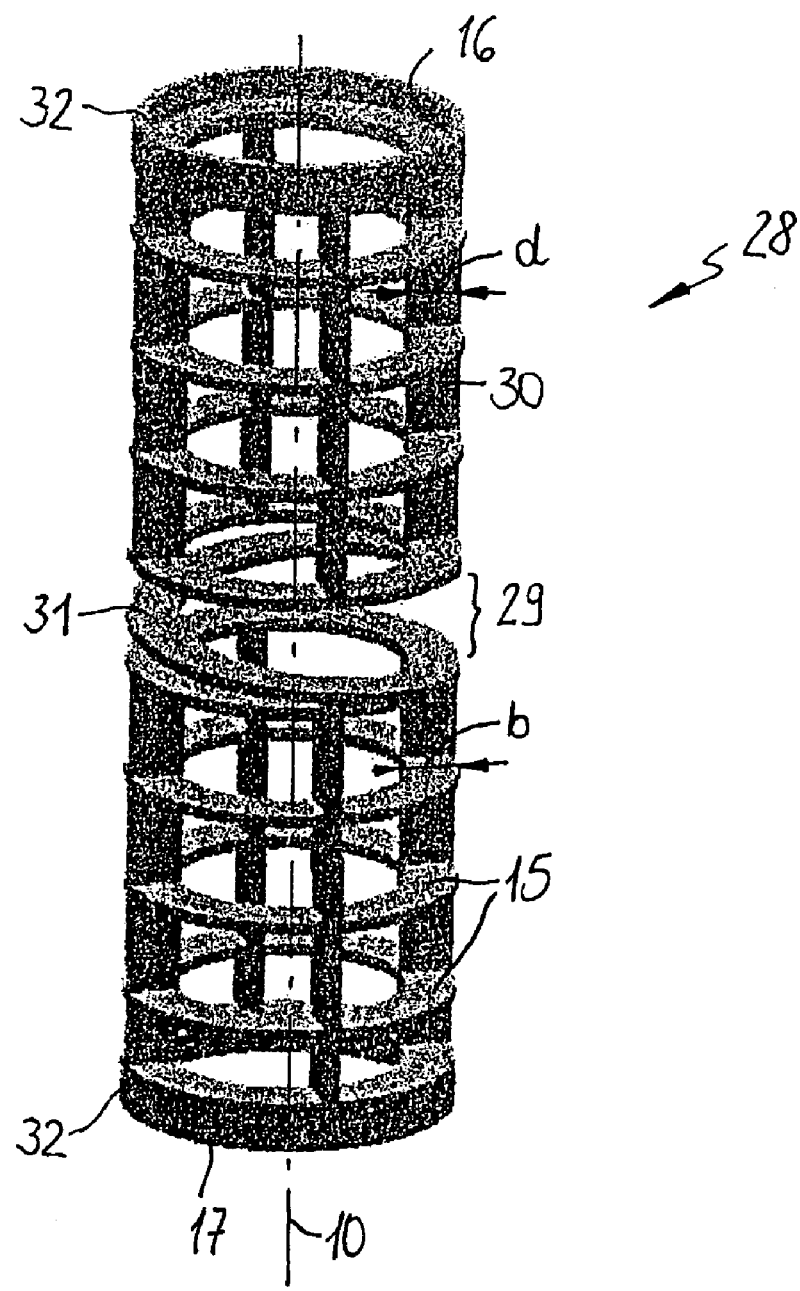

FILTER INSERT WITH VARIABLE LENGTH CENTER TUBE

BACKGROUND OF THE INVENTION

This invention relates to a filter insert comprising an annular filter element connected in a fluid-tight manner on one axial end face to a cover and on an opposite axial end face to a base, and having a central channel communicating with a central opening in the cover and having a central tube situated therein extending between the cover and the base.

Filter inserts comprising a filter element fixedly connected to a cover and a base are known in general and are used as replaceable filter cartridges. To ensure adequate stability of the filter element, such filters usually have a central tube running between the cover and the base in the central channel of the filter element. The central channel thus communicates with an opening in the cover, which usually forms the outlet from the filter. To ensure adequate stability of the filter insert, the central tube should always extend from the base to the cover of the filter. The filter element usually comprises filter paper in lamellar folds or other filter media. Such a filter bellows may have considerable tolerances in its dimensions. To ensure that the central tube extends between the cover and the base, there must be a narrow tolerance in the filter element or central tubes of different lengths must be made available.

SUMMARY OF THE INVENTION

It is an object of the invention to provide an improved filter insert.

Another object of the invention is to provide a filter insert with a center tube that can automatically compensate for length tolerances.

A further object of the invention is to provide a filter insert with a variable length center tube that has a high stability.

An additional object of the invention is to provide a filter insert with a variable length center tube that can be manufactured easily.

These and other objects are achieved in accordance with the present invention by providing a filter insert comprising an annular filter element connected in a fluid-tight manner at one axial end face to a cover and at an opposite axial end face to a base; said filter element having a central channel in which a central tube is situated extending between the cover and the base with said central channel communicating with a central opening in the cover; wherein the central tube has a variable length in the direction of its longitudinal central axis.

The variable length of the central tube in the direction of the longitudinal central axis of the central tube makes it possible to use the same central tube even with filter elements having a considerable deviation in their axial length. When designed appropriately, such a central tube may also be used in filters of different axial lengths, thus permitting a reduction in the number of parts which must be kept on hand. At the same time, the cost of manufacturing the central tube and keeping it in stock is reduced.

The central tube advantageously has a length-compensating section, designed to be resilient in the direction of the longitudinal central axis of the central tube. The central tube thus automatically adapts to the axial length of the filter element. Thus, adequate stability of the filter element can be ensured easily at the same time because this assures that the central tube will extend over the entire length of the filter element.

The central tube is advantageously made of rings arranged at a right angle to the longitudinal central axis of the central tube, these rings being joined together by stays extending in the axial direction. In particular, one or more stays are designed to be resilient in a length-compensating section. Accordingly, at least one stay may be advantageously designed in a V shape in a length-compensating section. The V-shaped design of a stay ensures an adequate spring path in the longitudinal direction of the central tube due only to the natural elasticity of the material. In the circumferential direction of the central tube, however, torsion is prevented with this design. Alternatively, it may be advantageous for at least one stay to extend in a spiral around the longitudinal central axis of the central tube in a length-compensating section. This makes it possible to realize larger spring paths.

At least one stop is advantageously provided to limit the minimum length of the central tube. This makes it possible in particular to prevent the stays, which are designed to be resilient, from being destroyed due to excess compression of the central tube. The stop is advantageously formed by a stay which extends into the length-compensating section and has its end situated at a distance from a ring adjacent to this section.

The central tube and the cover together forms a receptacle for a gasket. A connection for supplying or removing a medium to be filtered may be provided on this gasket. Particularly when the central tube and cover are made of molded synthetic resin material (i.e., plastics), it is essential for the parts to separate well from the molds in which they are formed. To facilitate this, the receptacle is designed as a circumferential groove which is divided at a right angle to the longitudinal central axis of the central tube, with part of the receptacle being integrally molded on the central tube and part on the cover. To ensure a good seal, the receptacle must have a predetermined size. Due to the variable length of the central tube, which is particularly designed to be resilient, it is possible to ensure that the two parts forming the receptacle are in tight contact with one another. It is thus possible to assure that a predetermined size of the receptacle will be maintained.

The central tube, the base and/or cover may advantageously be made of synthetic resin material, in particular POM or polyamide (PA). The filter element is attached to the cover and the base in particular by hot tool welding or by butt welding. Such a weld can be produced easily and quickly. At the same time, a tight connection of the filter element to the cover and base can be ensured without any additional means.

BRIEF DESCRIPTION OF THE DRAWINGS

The invention ill be described in further detail hereinafter with reference to illustrative preferred embodiments shown in the accompanying drawing figures in which:

FIG. 10 is a perspective view of a central tube according to the invention.

DETAILED DESCRIPTION OF PREFERRED EMBODIMENTS

Figure 1:
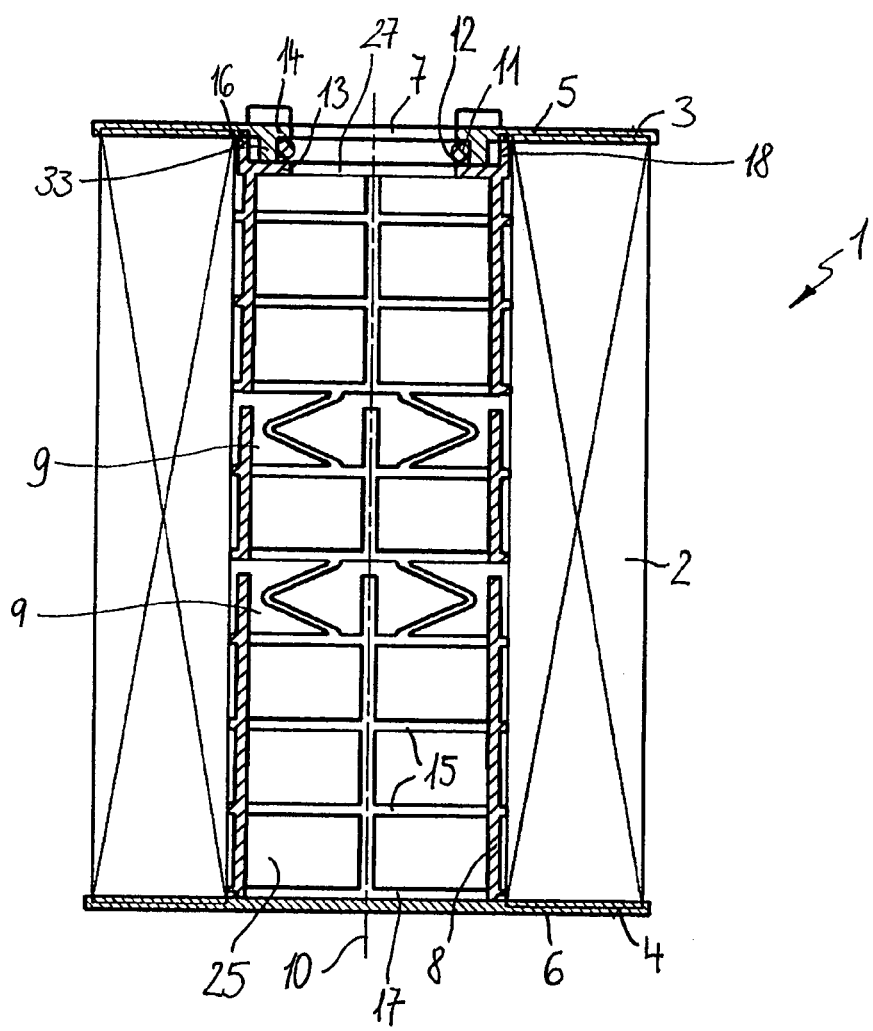
FIG. 1 is longitudinal sectional view through a filter according to the invention taken along the line I—I in FIG. 2.
Figure 2:
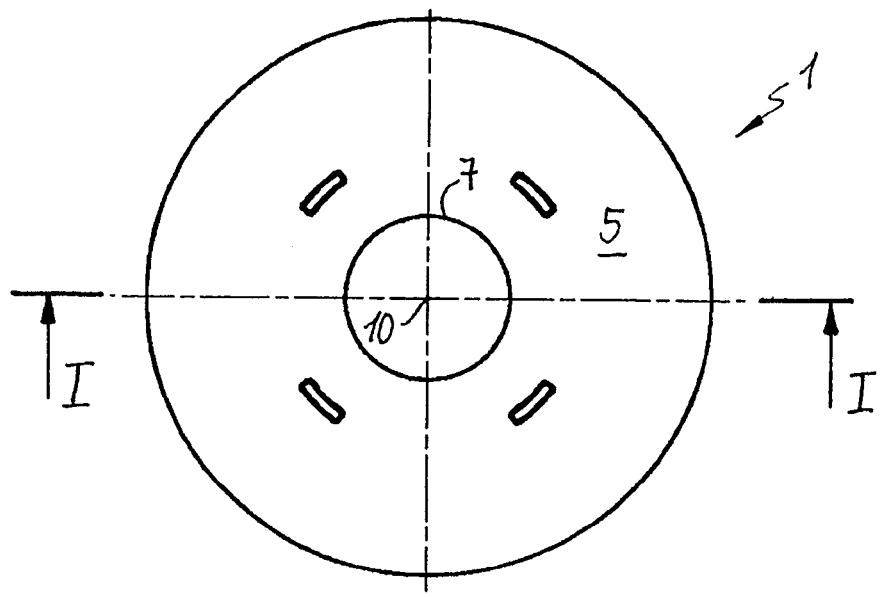
FIG. 2 is a top view of the filter from FIG. 1.
Figure 3:
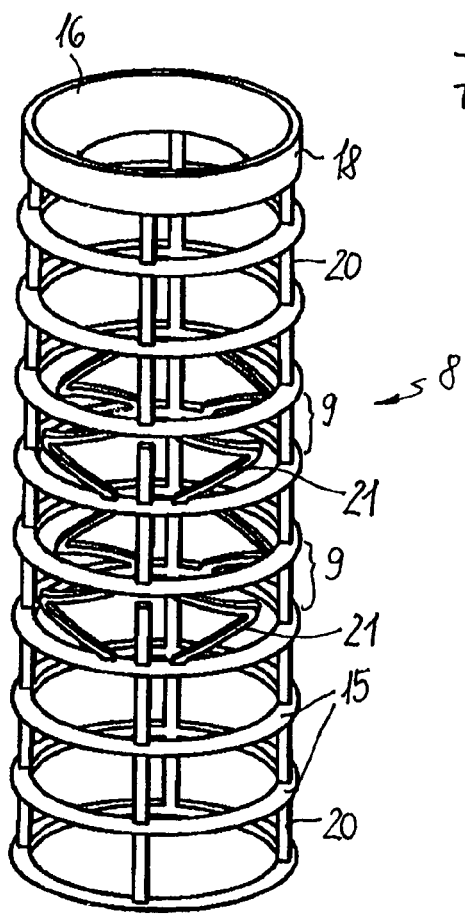
FIG. 3 is a perspective view of the central tube of the filter of FIG. 1.
Figure 4:
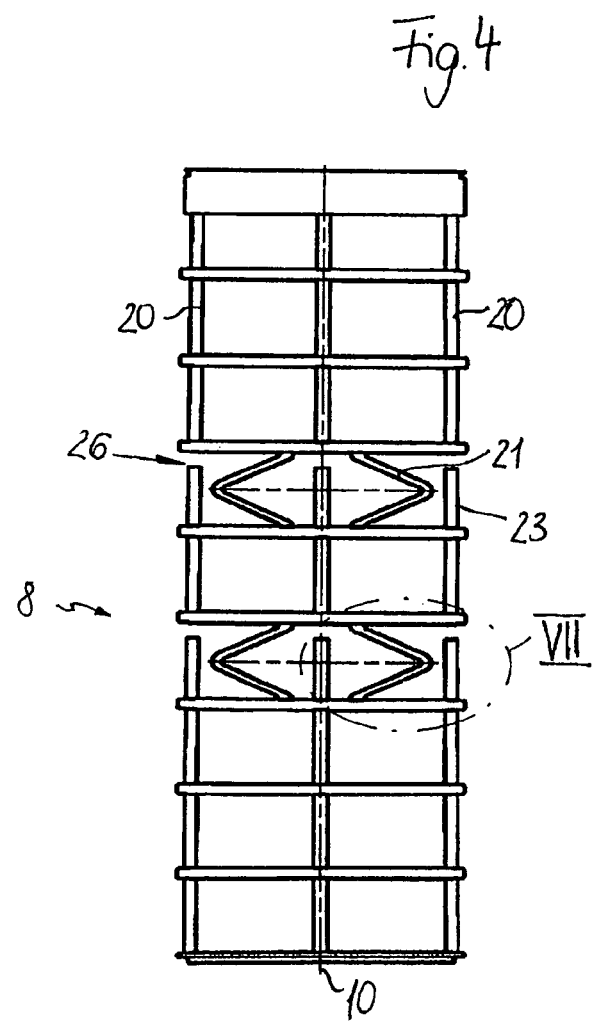
FIG. 4 is a side elevational view of the central tube of FIG. 3.
Figure 5:
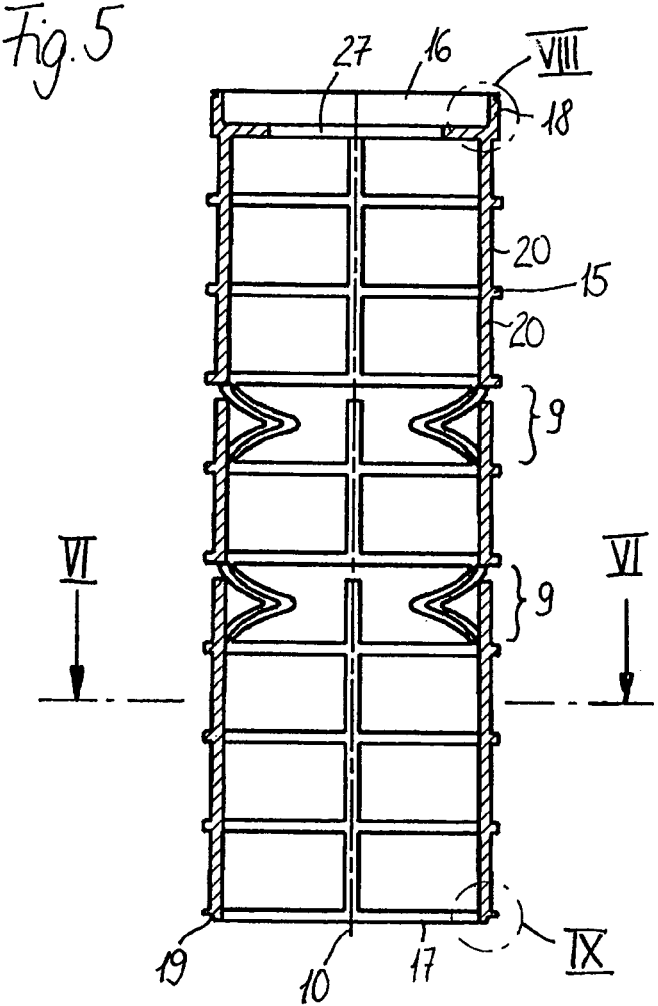
FIG. 5 is a longitudinal sectional view of the central tube of FIG. 3.

The filter 1 shown in FIG. 1 has a filter element 2, which separates an unfiltered fluid side from a clean side in a filter housing. The filter element 2 may be, for example, filter bellows made of filter paper in lamellar folds or some other filter medium. The filter element 2 is cylindrical and has a cylindrical central channel 25. On one end face 3 of the filter element 2, a cover is provided having a central opening 7 as also shown in FIG. 2. On the opposite end face 4, there is a base 6, which is connected to the filter element 2. Base 6 is designed in the shape of a disk which seals the central channel 25.

The cover 5 and the base 6 are joined in a fluid-tight seal to the filter element 2 by hot tool welding or butt welding. To join the cover 5 and the base 6 to the filter element 2, the cover 5 and the base 6, which are made of synthetic resin material, in particular POM or polyamide (PA), are heated until the material on the side facing the filter element 2 is plastically deformable. In this state, the filter element 2 is pressed tightly against the cover 5 and the base 6 so that the end faces 3 and 4 of the filter element 2 are joined to the material of the cover 5 and the base 6. The annular filter element 2 is thereby sealed in a fluid-tight connection at its axial end faces 3 and 4.

A central tube 8 which is situated in the central channel 25 is in contact with the base 6 at its end 17 and is welded to the cover 5 on its opposite end 16. In the area of the cover 5, the central tube 8 and the cover 5 together form a receptacle 12 which is designed as a peripheral groove in which a gasket 11, in particular an O-ring, is situated. The receptacle 12 is designed so that it is divided in a direction perpendicular to the longitudinal central axis 10 of the central tube 8 to ensure that the central tube 8 and the cover 5 can be unmolded. The part 13 of the receptacle 12 integrally molded on the central tube 8 is formed by a disk-shaped shoulder on the central tube 8. The disk-shaped shoulder extends radially inward from the filter element 2 and has a central opening 27, which communicates with the opening 7 in the cover 5. The second part 14 of the receptacle 12, which is integrally molded on the cover 5, is formed by a shoulder 33, which extends from the cover 5 in the axial direction to the base 6 in an area radially outside of the opening 7. The shoulder 33 is designed in a ring shape here and forms the base of the receptacle 12.

To ensure a good seal with a connection situated in the openings 7 and 27 by the gasket 11, the receptacle 12 must have a predetermined size. This may be achieved by having the central tube 8 in tight contact with the cover 5. Therefore, length-compensating sections 9 are provided so that tolerances in the axial length of the filter element 2 can be compensated.

Figure 6:
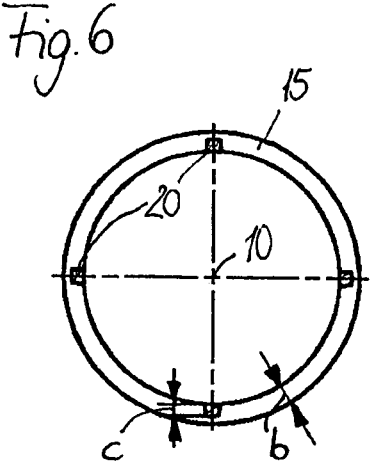
FIG. 6 is a sectional view taken along line VI—VI.

The central tube 8 is shown in detail in FIGS. 3 through 9. The central tube 8 is formed by rings 15 which extend in the peripheral direction to the longitudinal central axis 10 of the central tube 8. The central tube 8 here is formed by nine rings 15. Instead of a ring 15, a ring flange 18 having a greater axial extent is provided on the end 16 facing the cover 5. The rings 15 are held in the direction of the longitudinal central axis 10 by stays 20 which extend between adjacent rings 15 in parallel with the longitudinal central axis 10 and connect them. Four stays 20 are distributed uniformly around the circumference between two rings 15. As shown in FIG. 6 in particular, the rings 15 have a width b, measured in the radial direction of the longitudinal central axis 10, which is greater than the width c of the stays 20, also measured in the radial direction. The stays 20 are arranged on the inside circumference of the rings 15 so that only the rings 15 are in contact with the filter element 2.

The central tube 8 has two length-compensating sections 9. The length-compensating sections 9 are each at a distance from the base 6 and the cover 5 of the filter 1 corresponding approximately to the length of three stays 20 with the rings 15 provided between them.

The length-compensating sections 9 are designed to be resilient in the direction of the longitudinal central axis 10. Therefore, stays 21 which are resilient in the direction of the longitudinal central axis 10 are provided. The stays 21 are designed in a V shape. Four V-shaped stays 21 are arranged in one section 9, with the V of adjacent stays 21 in the peripheral direction opening in the opposite direction.

Figure 7:
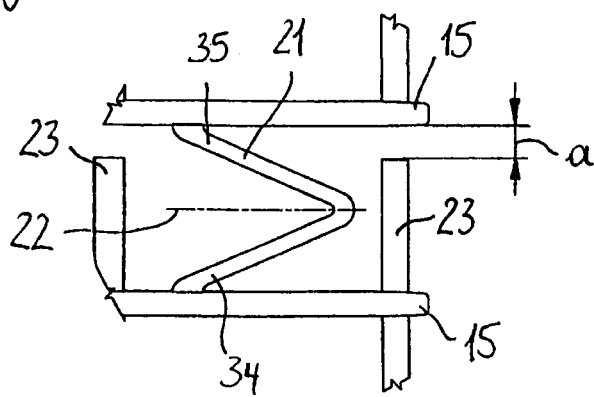
FIG. 7 is an enlarged detail view of the area VII of FIG. 4.

Between two stays 21, there is a stay 23 which is secured on a ring 15 and extends in the direction of the adjacent ring 15 in the section 9. As shown in FIG. 7, a distance a is formed between the stay 23 and a ring 15. The stay 23 together with the corresponding ring 15 forms a stop 26 which defines the minimum length in the length-compensating section 9. This prevents a stay 21 from breaking due to excessive deformation and thereby being destroyed.

As shown in FIG. 7, each stay 21 is secured with a leg 34 on a ring 15 and with a leg 35 on the opposite ring 15 bordering the section 9. The legs 34 and 35 are designed to be symmetrical with an axis of symmetry 22 which runs perpendicular to the longitudinal central axis 10 of the central tube 8.

Figure 8:
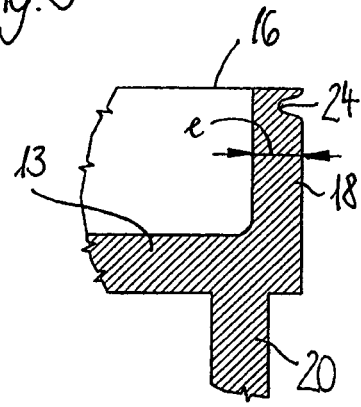
FIG. 8 is an enlarged view of the detail VIII of from FIG. 5.

On the end 16 facing the cover 5, the central tube 8 has an annular flange 18 which is shown in an enlarged sectional view in FIG. 8. In the area of the end 16, the annular flange 18 has a peripheral groove 24 on its outside circumference, extending over approximately half of the thickness e of the annular flange 18 as measured in the radial direction. The groove 24 ensures a secure fixation of the central tube 8 in the cover 5.

Figure 9:
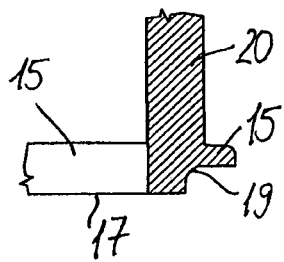
FIG. 9 is a enlarged view of the detail IX from FIG. 5.

As shown in FIG. 9 on an enlarged scale, the ring 15 situated on the end 17 facing the base 6 is provided at the end 17 on its outside circumference with a recess 19 which ensures a secure footing of the central tube 8 on the base 6.

FIG. 10 shows an illustrative embodiment of a central tube 28. Like the central tube 5, the central tube 28 is formed by rings 15. The rings 15 are joined by stays 30 running in the direction of the longitudinal central axis 10. The width b measured in the radial direction corresponds to the width d of the stays 30 as measured in the radial direction. The central tube 28 has an edge 32 designed in a ring shape on the end 16 facing the cover 5 as well as on the end 17 facing the base. The central tube 28 has a length-compensating section 29, which is situated in the center of the central tube 28. A spiral stay 31 is situated in the section 29, its width measured in the radial direction corresponding to the width b of the rings 15. The stays 31 extend in a spiral pattern around the longitudinal central axis 10 approximately once around the circumference of the central tube 28. The spiral-shaped stays 31 permit a resilient compensation of the length of the central tube 28.

Other configurations of the stays 21 and/or the stay 31 may also be advantageous. In particular, more or fewer stays 21 and more stays 31 than in the exemplary embodiments depicted here may be provided.

The foregoing description and examples have been set forth merely to illustrate the invention and are not intended to be limiting. Since modifications of the described embodiments incorporating the sprit and substance of the invention may occur to persons skilled in the art, the invention should be construed broadly to include all variations within the scope of the appended claims and equivalents thereof.

What is claimed is:

1. A filter insert comprising an annular filter element connected in a fluid-tight manner at one axial end face to a cover and at an opposite axial end face to a base;

said filter element having a central channel in which a central tube is situated extending between the cover and the base with said central channel communicating with a central opening in the cover;

wherein the central tube is formed by rings arranged perpendicular to the longitudinal central axis of the central tube, and has a variable length along its longitudinal central axis, said rings being joined together in the axial direction by stays, wherein at least one of said stays has a length-compensating section with a resilient structure, said at least one stay being secured with legs positioned to be symmetrical with an axis of symmetry that runs perpendicular to the longitudinal central axis of the central tube said length-compensating section including at least one stop for limiting the minimum length of the central tube, said at least one stop being spaced from said legs.

2. A filter insert according to claim 1, wherein the central tube comprises at least one length-compensating section with a structure which is resilient in the direction of the longitudinal central axis of the central tube.

3. A filter insert according to claim 1, wherein said at least one stay has a V-shape in the length-compensating section.

4. A filter insert according to claim 1, wherein said at least one stop is formed by a stay in a length-compensating section which extends toward and is spaced a distance (a) from an adjacent ring of the central tube.

5. A filter insert according to claim 1, wherein the central tube and the cover together form a receptacle for a gasket.

6. A filter insert according to claim 5, wherein the receptacle is a peripheral groove which is divided at a right angle to the longitudinal central axis of the central tube, a part of the receptacle being integrally molded on the central tube, and part of the receptacle being integrally molded on the cover.

7. A filter insert according to claim 1, wherein the central tube is made of a synthetic resin material.

8. A filter insert according to claim 1, wherein at least one of the base and the cover is made of synthetic resin material.

9. A filter insert according to claim 8, wherein the filter element is welded to the cover and the base.

* * * * *